United States Patent
Zhou et al.

(10) Patent No.: US 8,703,020 B2
(45) Date of Patent: Apr. 22, 2014

(54) BISMUTH ION SENSITIZED RARE EARTH GERMANATE LUMINESCENCE MATERIALS AND PREPARATION METHODS THEREOF

(75) Inventors: Mingjie Zhou, Shenzhen (CN); Wenbo Ma, Shenzhen (CN); Zhaopu Shi, Shenzhen (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 184 days.

(21) Appl. No.: 13/501,596

(22) PCT Filed: Oct. 12, 2009

(86) PCT No.: PCT/CN2009/074408
§ 371 (c)(1),
(2), (4) Date: Apr. 12, 2012

(87) PCT Pub. No.: WO2011/044720
PCT Pub. Date: Apr. 21, 2011

(65) Prior Publication Data
US 2012/0199791 A1    Aug. 9, 2012

(51) Int. Cl.
*C09K 11/78*    (2006.01)
*C09K 11/77*    (2006.01)

(52) U.S. Cl.
CPC .................. *C09K 11/7775* (2013.01)
USPC .................................. 252/301.4 F

(58) Field of Classification Search
CPC .................................. C09K 11/7775
USPC .................................. 252/301.4 F
See application file for complete search history.

(56) References Cited

U.S. PATENT DOCUMENTS 8,591,768 B2 * 11/2013 Zhou et al. .............. 252/301.4 F

OTHER PUBLICATIONS

Baran, E. J. et al., Vibrational Spectra of YbBiGeO5, Journal of Raman Spectroscopy, 2002, vol. 33, No. 10, pp. 838-840, especially p. 840 table 3, CODEN: JRSPAF; ISSN: 0377-0486.
Cas Cales, C. et al., Spectroscopic Characterization and Systematic Crystal-Field Modeling of Optically Active Rare Earth R3+ Ions in the Bismuth German ate BiY1-xRxGeO5 Host, Chemistry of Materials, 2006, vol. 18, No. 16, pp. 3742-3753, especially experimental section in p. 3743, CODEN: CMATEX; ISSN: 0897-4756.
Cascales, C. et al. Crystal-field Analysis of Eu3+ Energy Levels in the New Rare-earth R BiY 1_xRxGe05 Oxide, Journal of Solid State Chemistry, 2003, vol. 171, pp. 262-267, especially experimental details in p. 263, CODEN: JSSCBI; ISSN: 0022-4596.

(Continued)

*Primary Examiner* — Carol M Koslow
(74) *Attorney, Agent, or Firm* — Shimokaji & Associates P.C.

(57) ABSTRACT

Bismuth ion sensitized rare earth germanate luminescence materials and preparation methods are disclosed. The luminescence materials are the compounds of the following general formula $(Y_{1-x-y-z}A_xBi_yLn_z)_2GeO_5$. The preparation methods comprise: using oxides, carbonates, oxalates, acetates, nitrates or halides of Y, A, Bi, Ln and Ge as raw materials, wherein A is one of Gd, Lu, Sc and La, and Ln is at least one of Tm, Ho, Sm, Tb, Eu and Dy, homogeneously grinding the raw materials, sintering at 1300-1500° C. for 6-24 h, and then cooling them to room temperature to obtain the bismuth ion sensitized rare earth germanate luminescence materials.

14 Claims, 5 Drawing Sheets

(56) References Cited

OTHER PUBLICATIONS

Zhao F et al: "Luminescent properties of Eu<3+>, Tb<3+> or Bi<3+> activated yttrium germanates", Materials Research Bulletin, Elsevier, Kidlington, GB, vol. 38, No. 6, May 26, 2003, pp. 931-940, XP004428203, ISSN: 0025-5408, DOI: 10.1016/S0025-5408(03)00086-2 * pp. 932,938-940.

Guo P et al: "Novel phosphors of Eu<3+>, Tb<3+> or Bi<3+> activated Gd2GeO5", Journal of Luminescence, Elsevier BV North-Holland, NL, vol. 105, No. 1, Sep. 1, 2003, pp. 61-67, XP004443828, ISSN: 0022-2313, DOI: 10.1016/S0022-2313(03)00098-X* pp. 62,66.

* cited by examiner

FIG.5 ary of the present invention. will be illus-
BISMUTH ION SENSITIZED RARE EARTH GERMANATE LUMINESCENCE MATERIALS AND PREPARATION METHODS THEREOF

FIELD OF THE INVENTION

The present invention relates to the luminescence materials and preparation methods, and more particularly to a bismuth ion sensitized rare earth germanate luminescence materials and preparation methods thereof.

BACKGROUND OF THE INVENTION

Currently, as a new type of high-efficiency luminescence materials, rare earth luminescence materials has been developed into important luminescence materials in the fields of information display, lighting source, optoelectronic devices etc. By improving luminescence intensity of the rare earth luminescence materials, the properties of luminescence devices could be effectively improved, meanwhile, the luminescence efficiency of the luminescence devices could be improved and the luminescence devices could effectively save energy. Therefore, the research and application of luminescence materials with high luminescence efficiency always are the important research contents in the fields of materials chemistry and materials physics.

The germanate luminescence materials doped with rare earth ion have good photoluminescence properties, and could emit light with high fluorescence color and high brightness after been excited, thus could be applied as trichromatic fluorescence of UV-LED. However, further improves the luminescence properties of the materials has been the targets of the researchers.

SUMMARY OF THE INVENTION

The technical problem of the present invention to be solved is to provide bismuth ion sensitized rare earth germanate luminescence materials which may further increase photoluminescence properties of the germanate luminescence materials doped with rare earth ion.

The further technical problem of the present invention to be solved is to provide preparation methods of bismuth ion sensitized rare earth germanate luminescence materials, and the preparation methods are easy to carry out and the costs of such methods are low.

The technical solution to solve the technical problem in the present invention is: bismuth ion sensitized rare earth germanate luminescence materials, which are the compounds of the following general formula $(Y_{1-x-y-z}A_xBi_yLn_z)_2GeO_5$, wherein, the values of x, y and z are taken $0 \le x < 1$, $0 < y \le 0.02$, $0 < z \le 0.3$, and $x+y+z \le 1$, respectively, while A is one of Gd, Lu, Sc and La, and Ln is at least one of Tm, Ho, Sm, Tb, Eu and Dy.

In the bismuth ion sensitized rare earth germanate luminescence materials, preferably, the values of x, y and z are taken $0 \le x \le 0.5$, $0 < y \le 0.01$, $0 < z \le 0.2$, respectively.

The preparation methods of the bismuth ion sensitized rare earth germanate luminescence materials comprise: using oxides, carbonates, oxalates, acetates, nitrates or halides of Y, A, Bi, Ln and Ge as raw materials, wherein A is one of Gd, Lu, Sc and La, and Ln is at least one of Tm, Ho, Sm, Tb, Eu and Dy, homogeneously grinding the raw materials, sintering at 1300-1500° C. for 6-24 h, and then cooling them to room temperature to obtain the bismuth ion sensitized rare earth germanate luminescence materials.

In the preparation methods of the bismuth ion sensitized rare earth germanate luminescence materials, preferably, homogeneously grinding the raw materials, sintering at 1350-1450° C. for 10-20 h, and then cooling them to room temperature to obtain the bismuth ion sensitized rare earth germanate luminescence materials.

In the preparation methods of the bismuth ion sensitized rare earth germanate luminescence materials, preferably, the raw materials are added in a molar ratio of each element in chemical formula $(Y_{1-x-y-z}A_xBi_yLn_z)_2GeO_5$, wherein, the values of x, y and z are taken $0 \le x < 1$, $0 < y \le 0.02$, $0 < z \le 0.3$, and $x+y+z \le 1$, respectively.

In the preparation methods of the bismuth ion sensitized rare earth germanate luminescence materials, preferably, the values of x, y and z are taken $0 \le x \le 0.5$, $0 < y \le 0.01$, $0 < z \le 0.2$, respectively.

In the preparation methods of the bismuth ion sensitized rare earth germanate luminescence materials, the purity of the raw materials is not lower than 99.99% when the raw materials are oxides of Y, A, Bi, Ln and Ge.

In the preparation methods of the bismuth ion sensitized rare earth germanate luminescence materials, the purity of the raw materials is not lower than analytically pure when the raw materials are carbonates, oxalates, acetates, nitrates or halides of Y, A, Bi, Ln and Ge.

In the present invention, bismuth ion ($Bi^{3+}$) is introduced into the germanate luminescence materials doped with rare earth, and through the sensitization of the bismuth ion to other rare earth ion, the photoluminescence properties of germanate luminescence materials is significantly improved under same exciting conditions, while the wave length of the emitting light has not been changed. The luminescence materials in the present invention have good photoluminescence properties, could emit light with high color purity and high brightness after been stimulated, thus could be applied in light-emitting devices (LED).

The preparation methods of the present invention could prepare luminescence materials which have good photoluminescence properties, and the luminescence materials could emit light with high color purity and high brightness after been excited. The process comprises a few steps, the process is relatively simple, and the process conditions are easy to carry out. The methods could provide products of high quality without introducing impurity. The process conditions are not required stringently, thus the costs of the methods are low, so that the preparation methods could be widely applied in the manufacture of luminescence materials.

BRIEF DESCRIPTION OF THE DRAWINGS

Further description of the present invention will be illustrated, which combined with drawings and embodiments in the drawings.

The emission spectra of the above figures are tested by fluorescence spectrophotometer of Daojin RF-5301PC, and the test conditions are: slit at 1.5 nm, high sensitivity.

DETAILED DESCRIPTION OF ILLUSTRATED EMBODIMENTS

Embodiment 1

Figure 1:
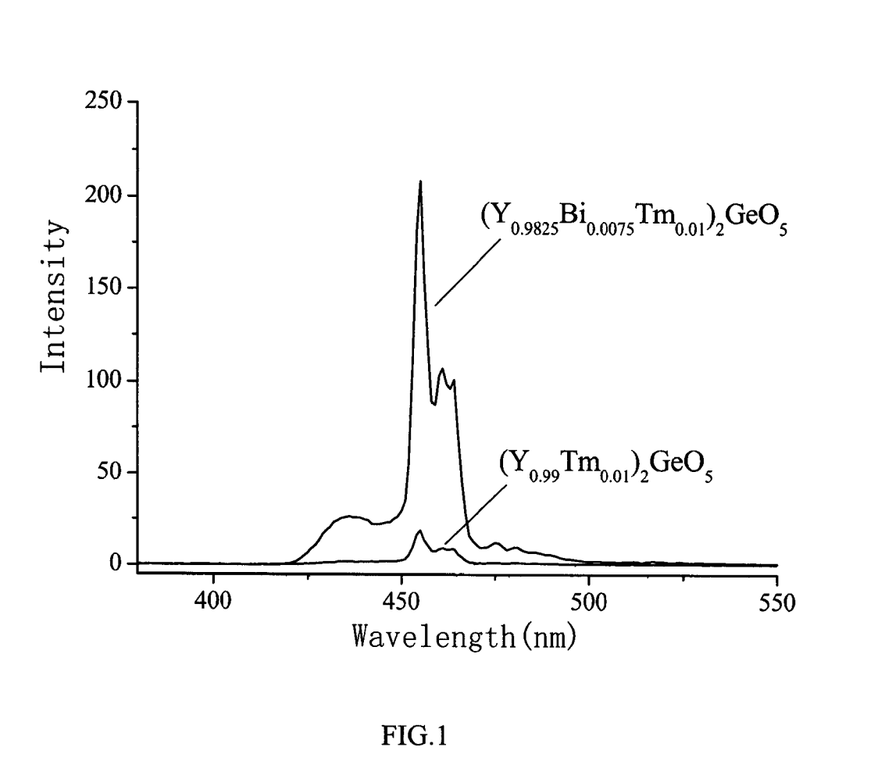
FIG. 1 shows the differences in the emission spectra of the comparison of the $(Y_{0.9825}Bi_{0.0075}Tm_{0.01})_2GeO_5$ materials which is prepared in embodiment 1, and the $(Y_{0.99}Tm_{0.01})_2GeO_5$ materials, as they are tested in same conditions of excitation wavelength of 314 nm.

Preparation of $(Y_{0.9825}Bi_{0.0075}Tm_{0.01})_2GeO_5$ by High Temperature Solid State Method Adding 0.9825 mmol $Y_2O_3$, 0.0075 mmol $Bi_2O_3$, 0.01 mmol $Tm_2O_3$ and 1 mmol $GeO_2$ into a agate mortar, all of the oxidate with purity of 99.99%, grinding the oxidate homogeneously in the agate mortar to mix well, transferring the grinded powder to a corundum crucible, and placing the corundum crucible into a high-temperature box-type furnace and sintering at 1350° C. for 10 h, and then cooling the sintered product to room temperature and grinding them in mortar, finally obtaining the bismuth ion sensitized rare earth germanate luminescence materials $(Y_{0.9825}Bi_{0.0075}Tm_{0.01})_2GeO_5$ materials, which can emit blue light. FIG. 1 shows the differences in the emission spectra of the comparison of the $(Y_{0.9825}Bi_{0.0075}Tm_{0.01})_2GeO_5$ which is prepared in embodiment 1, and the $(Y_{0.99}Tm_{0.01})_2GeO_5$ materials, as they are tested in same conditions of excitation wavelength of 314 nm. As can be seen from the FIG. 1, the introduction of $Bi^{3+}$ greatly enhanced the luminescence of $Tm^{3+}$, the luminescence intensity of the $(Y_{0.9825}Bi_{0.0075}Tm_{0.01})_2GeO_5$ is 12 times of that of $(Y_{0.99}Tm_{0.01})_2GeO_5$, under the excitation by excitation wavelength of 314 nm, wherein, the intensity is a relative value and its unit can be selected anyway.

Embodiment 2

Preparation of $(Lu_{0.9825}Bi_{0.0075}Tm_{0.01})_2GeO_5$ by High Temperature Solid State Method Adding 1.965 mmol $Lu(NO_3)_3$, 0.015 mmol $Bi(NO_3)_3$, 0.02 mmol $Tm(NO_3)_3$ and 1 mmol $GeO_2$ into a agate mortar, grinding the oxidate homogeneously in the agate mortar to mix well, transferring the grinded powder to a corundum crucible, and placing the corundum crucible into a high-temperature box-type furnace and sintering at 1450° C. for 8 h, and then cooling the sintered product to room temperature and grinding them in mortar, finally obtaining the bismuth ion sensitized rare earth germanate luminescence materials $(Lu_{0.9825}Bi_{0.0075}Tm_{0.01})_2GeO_5$, which can emit blue light.

Embodiment 3

Preparation of $(Y_{0.986}Bi_{0.004}Ho_{0.01})_2GeO_5$ by High Temperature Solid State Method Adding 0.986 mmol $Y_2O_3$, 0.004 mmol $Bi_2O_3$, 0.01 mmol $Ho_2O_3$ and 1 mmol $GeO_2$ into a agate mortar, grinding the oxidate homogeneously in the agate mortar to mix well, transferring the grinded powder to a corundum crucible, and placing the corundum crucible into a high-temperature box-type furnace and sintering at 1300° C. for 24 h, and then cooling the sintered product to room temperature and grinding them in mortar, finally obtaining the bismuth ion sensitized rare earth germanate luminescence materials $(Y_{0.986}Bi_{0.004}Ho_{0.01})_2GeO_5$, which can emit green light.

Embodiment 4

Preparation of $(Y_{0.976}Bi_{0.004}Sm_{0.02})_2GeO_5$ by High Temperature Solid State Method Adding 0.976 mmol $Y_2O_3$, 0.004 mmol $Bi_2O_3$, 0.02 mmol $Sm_2O_3$ and 1 mmol $GeO_2$ into a agate mortar, grinding the oxidate homogeneously in the agate mortar to mix well, transferring the grinded powder to a corundum crucible, and placing the corundum crucible into a high-temperature box-type furnace and sintering at 1500° C. for 6 h, and then cooling the sintered product to room temperature and grinding them in mortar, finally obtaining the bismuth ion sensitized rare earth germanate luminescence materials $(Y_{0.976}Bi_{0.004}Sm_{0.02})_2GeO_5$, which can emit red light.

Embodiment 5

Preparation of $(Y_{0.976}Bi_{0.004}Dy_{0.02})_2GeO_5$ by High Temperature Solid State Method Adding 0.976 mmol $Y_2O_3$, 0.004 mmol $Bi_2O_3$, 0.02 mmol $Dy_2O_3$ and 1 mmol $GeO_2$ into a agate mortar, grinding the oxidate homogeneously in the agate mortar to mix well, transferring the grinded powder to a corundum crucible, and placing the corundum crucible into a high-temperature box-type furnace and sintering at 1380° C. for 20 h, and then cooling the sintered product to room temperature and grinding them in mortar, finally obtaining the bismuth ion sensitized rare earth germanate luminescence materials $(Y_{0.976}Bi_{0.004}DY_{0.02})_2GeO_5$ which can emit white light.

Embodiment 6

Figure 2:
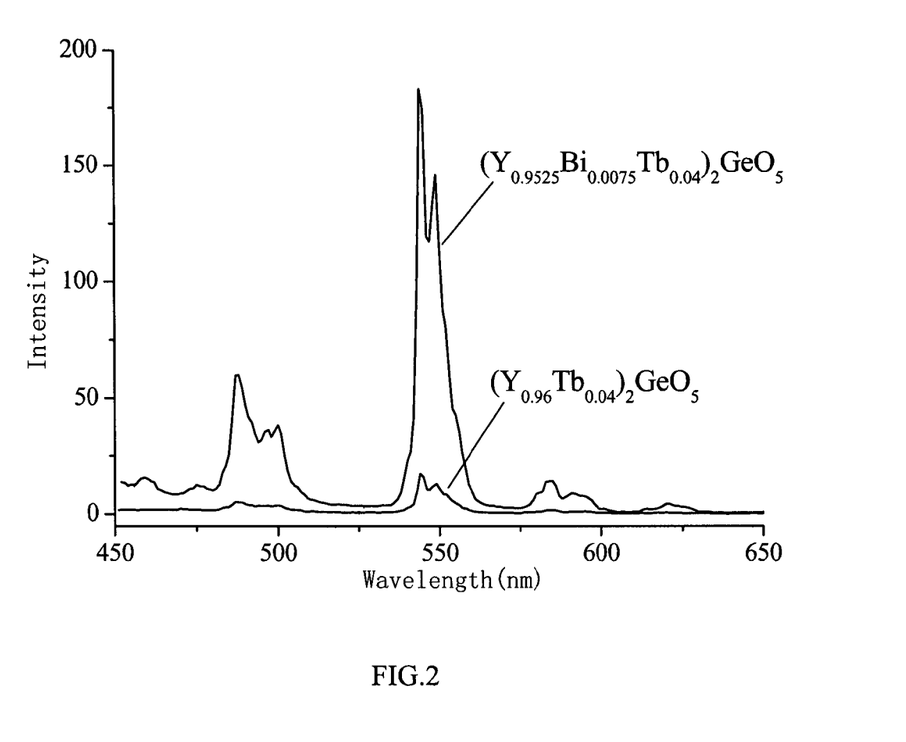
FIG. 2 shows the differences in the emission spectra of the comparison of the $(Y_{0.9525}Bi_{0.0075}Tb_{0.04})_2GeO_5$ materials which is prepared in embodiment 6, and the $(Y_{0.96}Tb_{0.04})_2GeO_5$ materials, as they are tested in same conditions of excitation wavelength of 314 nm.

Preparation of $(Y_{0.9525}Bi_{0.0075}Tb_{0.04})_2GeO_5$ by High Temperature Solid State Method Adding 0.9525 mmol $Y_2O_3$, 0.0075 mmol $Bi_2O_3$, 0.02 mmol $Tb_4O_7$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.9525}Bi_{0.0075}Tb_{0.04})_2GeO_5$ which can emit green light. FIG. 2 shows the differences in the emission spectra of the comparison of the the $(Y_{0.9525}Bi_{0.0075}Tb_{0.04})_2GeO_5$ materials which is prepared in embodiment 6, and the $(Y_{0.96}Tb_{0.04})_2GeO_5$ materials, as they are tested in same conditions of excitation wavelength of 314 nm. As can be seen from the FIG. 2, the introduction of $Bi^{3+}$ greatly enhanced the luminescence of $Tb^{3+}$. The luminescence intensity of the $(Y_{0.9525}Bi_{0.0075}Tb_{0.04})_2GeO_5$ is 11 times of that of $((Y_{0.96}Tb_{0.04})_2GeO_5$, under the excitation by excitation wavelength of 314 nm.

Embodiment 7

Figure 3:
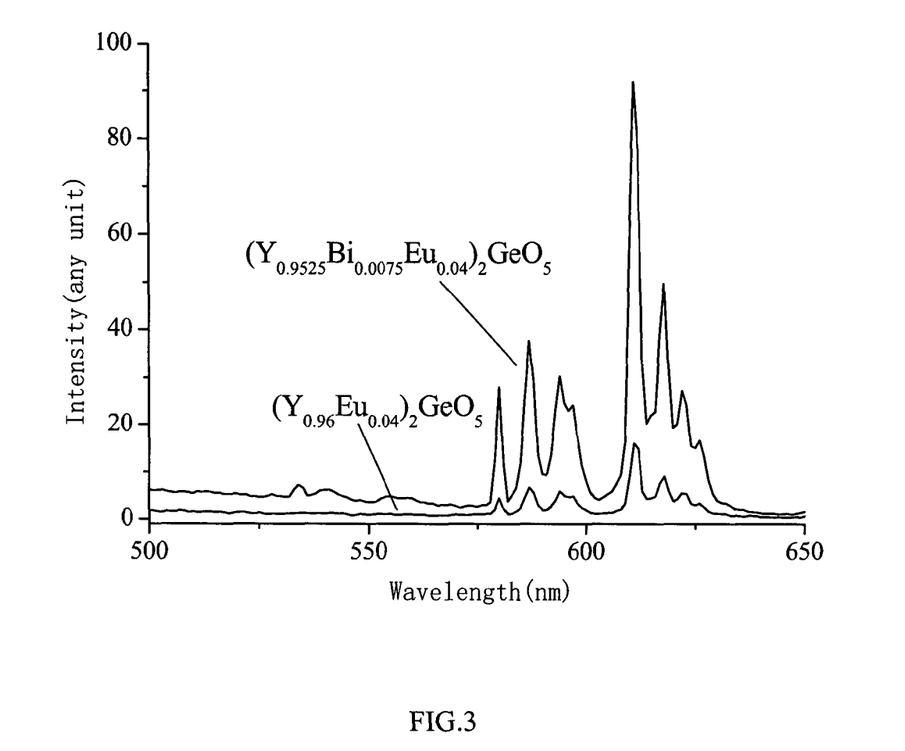
FIG. 3 shows the differences in the emission spectra of the comparison of the $(Y_{0.9525}Bi_{0.0075}Eu_{0.04})_2GeO_5$ materials which is prepared in embodiment 7, and the $(Y_{0.96}$ $Eu_{0.04})_2GeO_5$ materials, as they are tested in same conditions of excitation wavelength of 314 nm.

Preparation of $(Y_{0.9525}Bi_{0.0075}Eu_{0.04})_2GeO_5$ by High Temperature Solid State Method Adding 0.9525 mmol $Y_2O_3$, 0.0075 mmol $Bi_2O_3$, 0.04 mmol $Eu_2O_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.9525}Bi_{0.0075}Eu_{0.04})_2GeO_5$ which can emit red light. FIG. 3 shows the differences in the emission spectra of the comparison of the $(Y_{0.9525}Bi_{0.0075}Eu_{0.04})_2GeO_5$ materials which is prepared in embodiment 7, and the $(Y_{0.96}Eu_{0.04})_2GeO_5$ materials, as they are tested in same conditions of excitation wavelength of 314 nm. As can be seen from the FIG. 3, the introduction of $Bi^{3+}$ greatly enhanced the luminescence of $Eu^{3+}$. The luminescence intensity of the $(Y_{0.96}Eu_{0.04})_2GeO_5$ is 6 times of that of $(Y_{0.96}Eu_{0.04})_2GeO_5$, under the excitation by excitation wavelength of 314 nm.

Embodiment 8

Preparation of $(Y_{0.886}Gd_{0.1}Bi_{0.004}Tm_{0.01})_2GeO_5$ by High Temperature Solid State Method Adding 0.886 mmol $Y_2O_3$, 0.1 mmol $Gd_2O_3$, 0.004 mmol $Bi_2O_3$, 0.01 mmol $Tm_2O_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.886}Gd_{0.1}Bi_{0.004}Tm_{0.01})_2GeO_5$ which can emit blue light.

Embodiment 10

Preparation of $(Y_{0.686}Gd_{0.3}Bi_{0.004}Ho_{0.01})_2GeO_5$ by High Temperature Solid State Method Adding 0.686 mmol $Y_2O_3$, 0.3 mmol $Gd_2O_3$, 0.004 mmol $Bi_2O_3$, 0.01 mmol $Ho_2O_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.686}Gd_{0.3}Bi_{0.004}Ho_{0.01})_2GeO_5$ which can emit green light.

Embodiment 11

Preparation of $(Y_{0.196}Sc_{0.7}Bi_{0.004}Sm_{0.1})_2GeO_5$ by High Temperature Solid State Method Adding 0.196 mmol $Y_2O_3$, 0.7 mmol $Sc_2O_3$, 0.004 mmol $Bi_2O_3$, 0.1 mmol $Sm_2O_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.196}Sc_{0.7}Bi_{0.004}Sm_{0.1})_2GeO_5$ which can emit red light.

Embodiment 12

Preparation of $(Y_{0.076}La_{0.9}Bi_{0.004}Dy_{0.02})_2GeO_5$ by High Temperature Solid State Method Adding 0.076 mmol $Y_2O_3$, 0.9 mmol $La_2O_3$, 0.004 mmol $Bi_2O_3$, 0.02 mmol $Dy_2O_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.076}La_{0.9}Bi_{0.004}Dy_{0.02})_2GeO_5$ which can emit white light.

Embodiment 13

Preparation of $(Y_{0.596}Gd_{0.1}Bi_{0.004}Tb_{0.3})_2GeO_5$ by High Temperature Solid State Method Adding 1.192 mmol $Y(CH_3COO)_3$, 0.2 mmol $Gd(CH_3COO)_3$, 0.008 mmol $Bi(CH_3COO)_3$, 0.6 mmol $Tb(CH_3COO)_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.596}Gd_{0.1}Bi_{0.004}Tb_{0.3})_2GeO_5$ which can emit green light.

Embodiment 14

Preparation of $(Y_{0.746}Gd_{0.1}Bi_{0.004}Eu_{0.15})_2GeO_5$ by High Temperature Solid State Method Adding 1.492 mmol $YCl_3$, 0.2 mmol $GdCl_3$, 0.008 mmol $BiCl_3$, 0.3 mmol $EuCl_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.746}Gd_{0.1}Bi_{0.004}Eu_{0.15})_2GeO_5$ which can emit red light.

Embodiment 15

Preparation of $(Y_{0.485}La_{0.5}Bi_{0.005}Tm_{0.01})_2GeO_5$ by High Temperature Solid State Method Adding 0.485 mmol $Y_2O_3$, 0.5 mmol $La_2O_3$, 0.005 mmol $Bi_2O_3$, 0.01 mmol $Tm_2O_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.485}La_{0.5}Bi_{0.005}Tm_{0.01})_2GeO_5$ which can emit blue light.

Embodiment 16

Preparation of $(Y_{0.88}Lu_{0.1}Bi_{0.01}Tm_{0.01})_2GeO_5$ by High Temperature Solid State Method Adding 0.88 mmol $Y_2(C_2O_4)_3$, 0.01 mmol $Lu_2(C_2O_4)_3$, 0.01 mmol $Bi_2(C_2O_4)_3$, 0.01 mmol $Tm_2O_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.88}Lu_{0.1}Bi_{0.0})_2GeO_5$ which can emit blue light.

Embodiment 17

Preparation of $(Y_{0.87}Sc_{0.1}Bi_{0.02}Tm_{0.01})_2GeO_5$ by High Temperature Solid State Method Adding 0.87 mmol $Y_2(CO_3)_3$, 0.1 mmol $Sc_2(CO_3)_3$, 0.02 mmol $Bi_2(CO_3)_3$, 0.01 mmol $Tm_2O_3$ and 1 mmol $GeO_2$ into a agate mortar, grinding the oxidate homogeneously in the agate mortar to mix well, and other steps are as the same as embodiment 1, finally obtaining the bismuth ion sensitized rare earth germanate luminescence materials $(Y_{0.87}Sc_{0.1}Bi_{0.02}Tm_{0.01})_2GeO_5$ which can emit blue light.

Embodiment 18

Figure 4:
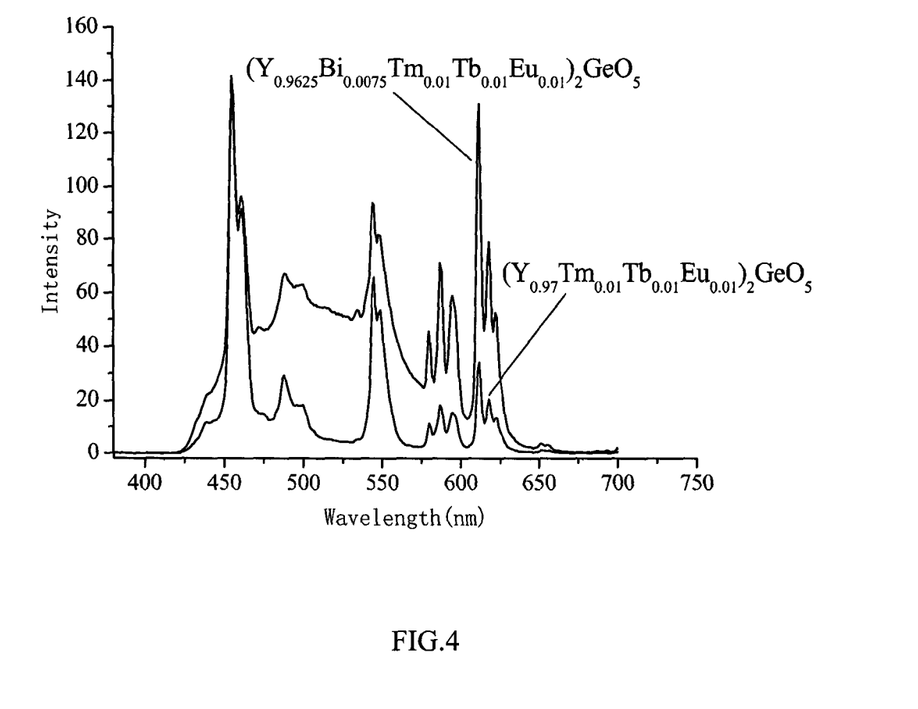
FIG. 4 shows the differences in the emission spectra of the comparison of the $(Y_{0.9625}Bi_{0.0075}Tm_{0.01}Tb_{0.01}Eu_{0.01})_2GeO_5$ materials which is prepared in embodiment 18, and the $(Y_{0.97}Tm_{0.01}Tb_{0.01}Eu_{0.01})_2GeO_5$ materials, as they are tested in same conditions of excitation wavelength of 360 nm.
Figure 5:
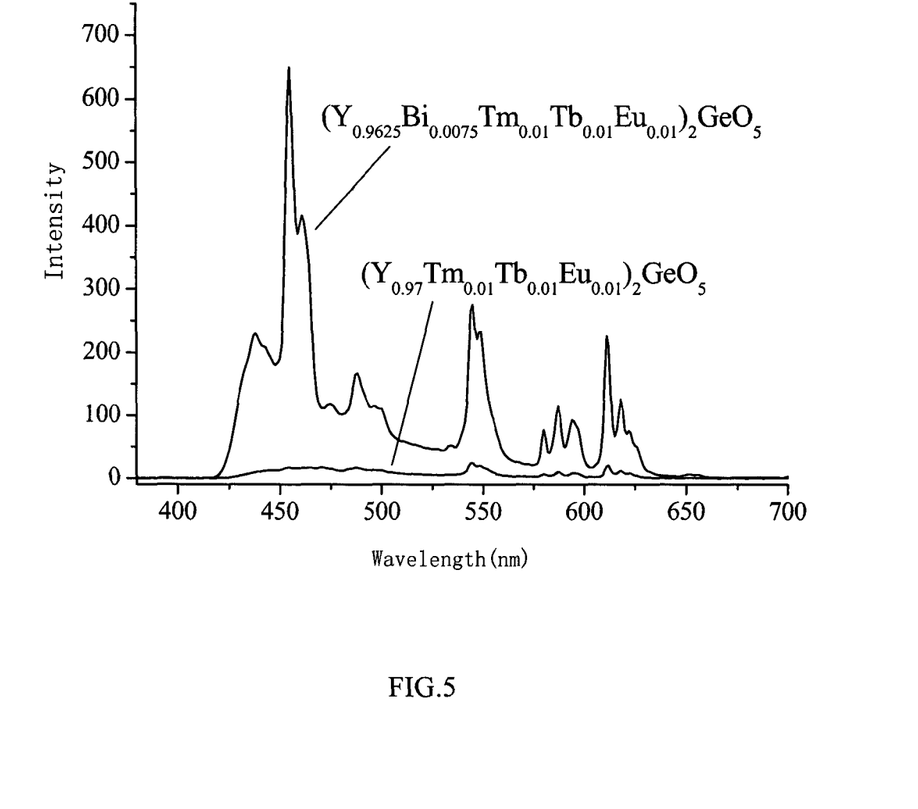
FIG. 5 shows the differences in the emission spectra of the comparison of the $(Y_{0.9625}Bi_{0.0075}Tm_{0.01}Tb_{0.01}Eu_{0.01})_2GeO_5$ materials which is prepared in embodiment 18 and the $(Y_{0.97}Tm_{0.01}Tb_{0.01}Eu_{0.01})_2GeO_5$ materials, as they are tested in same conditions of excitation wavelength of 314 nm.

Preparation of $(Y_{0.9625}Bi_{0.0075}Tm_{0.01}Tb_{0.01}Eu_{0.01})_2GeO_5$ by High Temperature Solid State Method Adding 0.9625 mmol $Y_2O_3$, 0.0075 mmol $Bi_2O_3$, 0.01 mmol $Tm_2O_3$, 0.005 mmol $Tb_4O_7$, 0.01 mmol $Eu_2O_3$ and 1 mmol $GeO_2$, grinding homogeneously in a agate mortar to mix well, and other steps are as the same as embodiment 1, finally obtaining the bismuth ion sensitized rare earth germanate luminescence materials $(Y_{0.9625}Bi_{0.0075}Tm_{0.01}Tb_{0.01}Eu_{0.01})_2GeO_5$ which can emit white light. FIG. 4 is the emission spectra figure of the comparison of the $(Y_{0.9625}Bi_{0.0075}Tm_{0.01}Tb_{0.01}Eu_{0.01})_2GeO_5$ materials prepared in this embodiment, and the $(Y_{0.97}Tm_{0.01}Tb_{0.01}Eu_{0.01})_2GeO_5$ materials, they are tested in same conditions of excitation wavelength of 360 nm. As shown in FIG. 4, under the excitation by excitation wavelength of 360 nm, the introduction of $Bi^{3+}$ has not enhanced the luminescence of $Tm^{3+}$, but greatly enhanced the blue, green and red light luminescence intensity of $Tb^{3+}$ and $Eu^{3+}$ emitted by luminescence materials in 470~630 nm, thus the $(Y_{0.9625}Bi_{0.0075}Tm_{0.01}Tb_{0.01}Eu_{0.01})_2GeO_5$ prepared in this embodiment has higher color rendering index. FIG. 5 is the emission spectra figure of the comparison of the $(Y_{0.9625}Bi_{0.0075}Tm_{0.01}Tb_{0.01}Eu_{0.01})_2GeO_5$ materials prepared in embodiment 18, and the $(Y_{0.97}Tm_{0.01}Tb_{0.01}Eu_{0.01})_2GeO_5$ materials, they are tested in same conditions of excitation wavelength of 314 nm. As shown in FIG. 5, under the excitation by excitation wavelength of 314 nm, the introduction of $Bi^{3+}$ greatly enhanced the luminescence of $Tm^{3+}$, $Tb^{3+}$ and $Eu^{3+}$, thus the $(Y_{0.9625}Bi_{0.0075}Tm_{0.01}Tb_{0.01}Eu_{0.01})_2GeO_5$ prepared in this embodiment has higher luminescence brightness.

What is claimed is:

1. Bismuth ion sensitized rare earth germanate luminescence materials, wherein are the compounds of the following general formula $(Y_{1-x-y-z}A_xBi_yLn_z)_2GeO_5$, wherein, the values of x, y and z are taken $0 \leq x < 1$, $0 < y \leq 0.02$, $0 < z \leq 0.3$, and $x+y+z \leq 1$, respectively, while A is one of Gd, Lu, Sc and La, and Ln is at least one of Tm, Ho, Sm, Tb, Eu and Dy.

2. The bismuth ion sensitized rare earth germanate luminescence materials according to claim 1, wherein, the values of the x, y and z are taken $0 \leq x \leq 0.5$, $0 < y \leq 0.01$, $0 < z \leq 0.2$, respectively.

3. The preparation methods of the bismuth ion sensitized rare earth germanate luminescence materials, wherein, comprise: using oxides, carbonates, oxalates, acetates, nitrates or halides of Y, A, Bi, Ln and Ge as raw materials, wherein A is one of Gd, Lu, Sc and La, and Ln is at least one of Tm, Ho, Sm, Tb, Eu and Dy, homogeneously grinding the raw materials, sintering at 1300-1500° C. for 6-24 h, and then cooling them to room temperature to obtain the bismuth ion sensitized rare earth germanate luminescence materials.

4. The preparation methods of the bismuth ion sensitized rare earth germanate luminescence materials according to claim 3, wherein, homogeneously grinding the raw materials, sintering at 1350-1450° C. for 10-20 h, and then cooling them to room temperature to obtain the bismuth ion sensitized rare earth germanate luminescence materials.

5. The preparation methods of the bismuth ion sensitized rare earth germanate luminescence materials according to claim 3, wherein, the raw materials are added in a molar ratio of each element in chemical formula $(Y_{1-x-y-z}A_xBi_yLn_z)_2GeO_5$, wherein, the values of the x, y and z are taken $0 \leq x < 1$, $0 < y \leq 0.02$, $0 < z \leq 0.3$, and $x+y+z \leq 1$, respectively.

6. The preparation methods of the bismuth ion sensitized rare earth germanate luminescence materials according to claim 5, wherein, the values of the x, y and z are taken $0 \leq x \leq 0.5$, $0 < y \leq 0.01$, $0 < z \leq 0.2$, respectively.

7. The preparation methods of the bismuth ion sensitized rare earth germanate luminescence materials according to claim 3, wherein, the purity of the raw materials is not lower than 99.99% when the raw materials are oxides of Y, A, Bi, Ln and Ge.

8. The preparation methods of the bismuth ion sensitized rare earth germanate luminescence materials according to claim 3, wherein, the purity of the raw materials is not lower than analytically pure when the raw materials are carbonates, oxalates, acetates, nitrates or halides of Y, A, Bi, Ln and Ge.

9. The preparation methods of the bismuth ion sensitized rare earth germanate luminescence materials according to claim 4, wherein, the purity of the raw materials is not lower than 99.99% when the raw materials are oxides of Y, A, Bi, Ln and Ge.

10. The preparation methods of the bismuth ion sensitized rare earth germanate luminescence materials according to claim 5, wherein, the purity of the raw materials is not lower than 99.99% when the raw materials are oxides of Y, A, Bi, Ln and Ge.

11. The preparation methods of the bismuth ion sensitized rare earth germanate luminescence materials according to claim 6, wherein, the purity of the raw materials is not lower than 99.99% when the raw materials are oxides of Y, A, Bi, Ln and Ge.

12. The preparation methods of the bismuth ion sensitized rare earth germanate luminescence materials according to claim 4, wherein, the purity of the raw materials is not lower than analytically pure when the raw materials are carbonates, oxalates, acetates, nitrates or halides of Y, A, Bi, Ln and Ge.

13. The preparation methods of the bismuth ion sensitized rare earth germanate luminescence materials according to claim 5, wherein, the purity of the raw materials is not lower than analytically pure when the raw materials are carbonates, oxalates, acetates, nitrates or halides of Y, A, Bi, Ln and Ge.

14. The preparation methods of the bismuth ion sensitized rare earth germanate luminescence materials according to claim 6, wherein, the purity of the raw materials is not lower than analytically pure when the raw materials are carbonates, oxalates, acetates, nitrates or halides of Y, A, Bi, Ln and Ge.

* * * * *